United States Patent
Carnahan et al.

(10) Patent No.: US 11,155,658 B2
(45) Date of Patent: Oct. 26, 2021

(54) MIXED CATALYST SYSTEMS FOR PRODUCING MULTIMODAL ELASTOMERS

(71) Applicant: Dow Global Technologies LLC, Midland, MI (US)

(72) Inventors: Edmund M. Carnahan, Pearland, TX (US); Philip P. Fontaine, Pearland, TX (US); Carl N. Iverson, Los Alamos, NM (US); Jeffrey C. Munro, Bellaire, TX (US); David M. Pearson, Lake Jackson, TX (US); Kim Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 350 days.

(21) Appl. No.: 16/318,568

(22) PCT Filed: Jul. 25, 2017

(86) PCT No.: PCT/US2017/043674
§ 371 (c)(1),
(2) Date: Jan. 17, 2019

(87) PCT Pub. No.: WO2018/022588
PCT Pub. Date: Feb. 1, 2018

(65) Prior Publication Data
US 2019/0276573 A1    Sep. 12, 2019

Related U.S. Application Data

(60) Provisional application No. 62/368,244, filed on Jul. 29, 2016.

(51) Int. Cl.
*C08F 210/16* (2006.01)
*C08L 23/08* (2006.01)
(Continued)

(52) U.S. Cl.
CPC ........ *C08F 210/16* (2013.01); *C08F 4/64193* (2013.01); *C08F 4/6592* (2013.01);
(Continued)

(58) Field of Classification Search
CPC ............... C08F 210/16; C08F 2500/05; C08F 2500/08; C08L 23/0815; C08L 23/16; C08L 2207/04; C08L 2207/06
See application file for complete search history.

(56) References Cited

U.S. PATENT DOCUMENTS

| 5,272,236 A | 12/1993 | Lai et al. |
| 5,278,272 A | 1/1994 | Lai et al. |

(Continued)

FOREIGN PATENT DOCUMENTS

| CN | 103421138 B | 10/2015 |
| EP | 2221329 B1 | 11/2014 |

(Continued)

OTHER PUBLICATIONS

International Search Report and Written Opinion issued by the U.S. Patent and Trademark Office as International Searching Authority for International Application No. PCT/US2017/043674 dated Oct. 13, 2017 (12 pages).

(Continued)

*Primary Examiner* — Catherine S Branch
(74) *Attorney, Agent, or Firm* — Dinsmore & Shohl LLP

(57) ABSTRACT

Embodiments of the present disclosure are directed to multimodal elastomers produced by olefin polymerization with a mixed catalyst system, specifically, a constrained geometry catalyst and a biphenyl phenol catalyst. The multimodal elastomers may be incorporated as impact modifiers in thermoplastic olefins.

15 Claims, 2 Drawing Sheets

(51) Int. Cl.

| | |
|---|---|
| *C08L 23/16* | (2006.01) |
| *C08F 4/64* | (2006.01) |
| *C08F 4/659* | (2006.01) |
| *C08F 4/6592* | (2006.01) |
| *C08L 23/12* | (2006.01) |
| *C08F 210/14* | (2006.01) |
| *C08F 2/01* | (2006.01) |

(52) U.S. Cl.
CPC ........ *C08F 4/65904* (2013.01); *C08F 210/14* (2013.01); *C08L 23/0815* (2013.01); *C08L 23/12* (2013.01); *C08L 23/16* (2013.01); *C08F 2/01* (2013.01); *C08F 2500/05* (2013.01); *C08L 2205/025* (2013.01); *C08L 2207/04* (2013.01); *C08L 2207/06* (2013.01)

(56) References Cited

U.S. PATENT DOCUMENTS

| | | | |
|---|---|---|---|
| 6,069,213 | A | 5/2000 | Nemzek et al. |
| 6,566,446 | B1 | 5/2003 | Parikh et al. |
| 6,610,408 | B1 † | 8/2003 | Srinivasan |
| 6,812,289 | B2 | 11/2004 | Van Dun et al. |
| 8,354,484 | B2 † | 1/2013 | Konze |
| 8,378,029 | B2 | 2/2013 | Liu et al. |
| 8,633,286 | B2 | 1/2014 | Kuo et al. |
| 9,000,108 | B2 | 4/2015 | Klosin et al. |
| 2008/0051537 | A1 | 2/2008 | Carnahan et al. |
| 2008/0269412 | A1 | 10/2008 | Carnahan et al. |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2015/0337062 | A1 | 11/2015 | Demirors et al. |
| 2015/0337063 | A1 | 11/2015 | Demirors et al. |
| 2015/0344602 | A1 | 12/2015 | Demirors et al. |

FOREIGN PATENT DOCUMENTS

| | | |
|---|---|---|
| WO | 9308221 A2 | 4/1993 |
| WO | 9820069 A1 | 5/1998 |
| WO | 2014209256 A1 | 12/2014 |
| WO | 2018022588 A1 | 2/2018 |

OTHER PUBLICATIONS

Irwin, Christopher, "Extrusion-blow molding," Modern Plastics Encyclopedia 89, Mid-Oct. Issue, vol. 65, No. 11, pp. 214-218 (5 total pages).

Parker, H. Randall, "Introduction to injection molding," Modern Plastics Encyclopedia 89, Mid-Oct. Issue, vol. 65, No. 11, pp. 264-268 (8 total pages).

Green, Michael W., "Injection molding thermoplastics," Modern Plastics Encyclopedia 89, Mid-Oct. Issue, vol. 65, No. 11, pp. 270-271 (6 total pages).

Amoco Chemicals Co., "Introduction to polypropylene," Modern Plastics Encyclopedia 89, Mid-Oct. Issue, vol. 65, No. 11, pp. 86-92 (10 total pages).

Kale, et al. "Structure-Property Relationships of Ethylene/1-Octene and Ethylene/1-Butene Copolymers Made Using INSITE Technology." Journal of Plastic Film & Sheeting, vol. 12, pp. 27-40 (Jan. 1996).†

† cited by third party

MIXED CATALYST SYSTEMS FOR PRODUCING MULTIMODAL ELASTOMERS

TECHNICAL FIELD

Embodiments of the present disclosure relate to multimodal elastomers, and specifically relate to multimodal polyolefin elastomers produced from olefin polymerization using mixed catalyst systems.

BACKGROUND

Olefin based elastomers comprising ethylene and α-olefins are produced via various catalyst systems. Selection of such catalyst systems used in the polymerization process of the olefin based polymers is an important factor contributing to the characteristics and properties of such olefin based polymers. Many different polymers and materials have been added to polymer formulations to enhance the impact strength or maintain the impact strength while enhancing other properties. For example, thermoplastic olefins (TPOs) are commonly used polymer formulations, because of desirable impact strength properties.

TPOs are often produced from blends of an elastomeric material such as ethylene based random copolymers, ethylene/propylene rubber (EPM) or ethylene/propylene diene monomer terpolymer (EPDM) and a more rigid material such as isotactic polypropylene. Other materials or components can be added into the formulation depending upon the application, including fillers such as talc. TPOs are often characterized by a balance of stiffness (modulus) and low temperature impact, and broad use temperatures. TPOs are often injection molded into articles for use in many applications, including automotive bumper fascia, instrument panels, pillars, and airbag covers. For TPO compounds, viscosities that allow for the easy filling with respect to the intended use as well as improved flowability over long, thin flow paths are sought.

Multimodal elastomers are effective impact modifiers for use in TPOs. However, multimodal elastomers need to be controlled such that they do not have high amounts of long chain branching and high viscosity, which may be detrimental when blending the multimodal elastomers into the TPOs. Accordingly, there may be a continual need for improved multimodal elastomers and methods of making same.

SUMMARY

Embodiments of the present disclosure meet this need by producing multimodal elastomers by olefin polymerization with a mixed catalyst system, specifically, a constrained geometry catalyst and a biphenyl phenol catalyst. The multimodal elastomer product of the present disclosure may have a high molecular weight fraction effective for use as an impact modifier, but with a low shear viscosity sufficient for blending in the TPOs.

In accordance with one embodiment of the present disclosure, the multimodal elastomer comprises a copolymer of ethylene and at least one α-olefin comonomer, wherein the multimodal elastomer comprises: 20 to 90% by weight of a high molecular weight (HMW) fraction, wherein the HMW fraction has a number average molecular weight (Mn) of at least 50 kg/mol, when measured according to gel permeation chromatography (GPC), and wherein the HMW fraction comprises at least 35% by weight of ethylene and at least 30% by weight of the α-olefin comonomer; a low molecular weight fraction (LMW) fraction, wherein the LMW fraction has an Mn of 4 to 25 kg/mol, and wherein the LMW fraction comprises at least 50% by weight of ethylene and at least 29% by weight of the α-olefin comonomer, the ratio of the Mn of HMW fraction to the Mn of the LMW fraction is at least 5 to 1; wherein the multimodal elastomer has a density between 0.853 to 0.875 g/cc, a shear viscosity at 100 rad/s of less than 2,500 Pa-s, and a shear viscosity at 0.1 rad/s of less than 120,000 Pa-s.

A further embodiment is directed to thermoplastic olefins comprising the multimodal elastomer and polypropylene.

In accordance with a method of making the multimodal elastomer, the method comprises adding to a reactor system, which includes one or multiple reactors, at least one ethylene monomer, at least one α-olefin comonomer, a first catalyst comprising a biphenyl phenol complex, and a second catalyst comprising a constrained geometry complex. The method further comprises producing the multimodal elastomer via solution polymerization at a temperature of at least 100° C. The multimodal elastomer comprises a high molecular weight (HMW) fraction and a low molecular weight (LMW) fraction, wherein the HMW fraction has a number average molecular weight (Mn) of at least 50 kg/mol, when measured according to gel permeation chromatography (GPC), and wherein the HMW fraction comprises at least 35% by weight of ethylene and at least 30% by weight of the α-olefin comonomer, and wherein the LMW fraction has an Mn of 4 to 25 kg/mol, and wherein the LMW fraction comprises at least 50% by weight of ethylene and at least 29% by weight of the α-olefin comonomer. Moreover, the multimodal elastomer comprises: a ratio of the Mn of the HMW fraction to the Mn of the LMW fraction of at least 5 to 1; a density between 0.853 to 0.875 g/cc; a shear viscosity at 100 rad/s of less than 2,500 Pa-s; and a shear viscosity at 0.1 rad/s shear of less than 120,000 Pa·s.

Additional features and advantages of the embodiments will be set forth in the detailed description and claims which follows, and in part will be readily apparent to those skilled in the art from that description or recognized by practicing the embodiments described herein.

BRIEF SUMMARY OF THE FIGURES

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
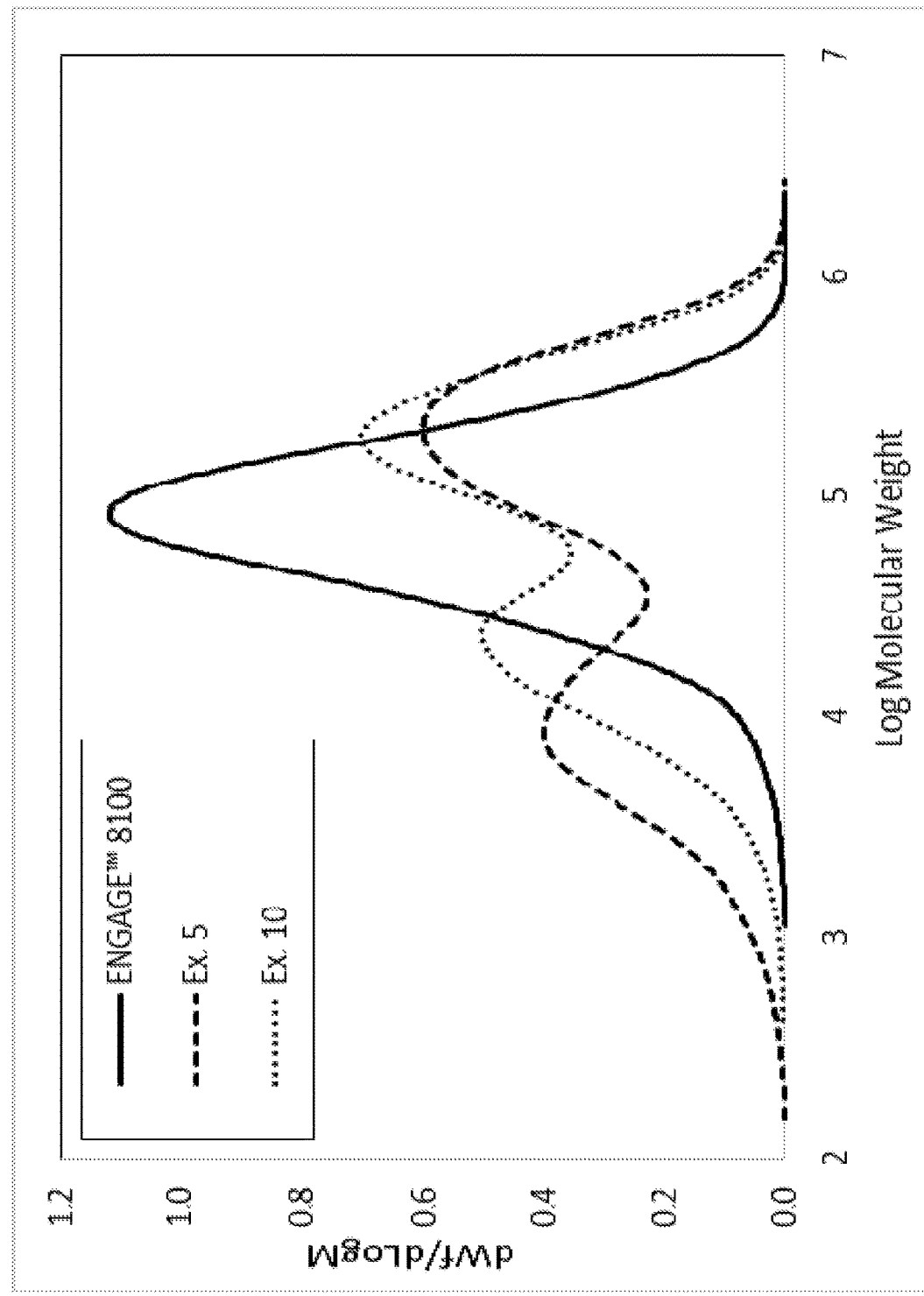
FIG. 1 is a GPC curve depicting data for multimodal and monomodal elastomers according to one or more embodiments of the present disclosure.

Embodiments of the present disclosure are directed a multimodal elastomer comprising a copolymer of ethylene and at least one α-olefin comonomer.

The term "multimodal," as used herein, means that the molecular weight distribution (MWD) in a gel permeation chromatography (GPC) curve exhibits two or more component polymers, for example, two or more peaks or wherein one component polymer may even exist as a hump, shoulder, or tail, relative to the MWD of the other component polymers.

In one or more embodiments of the present disclosure, the multimodal elastomer may be a bimodal elastomer. The term "bimodal," as used herein, means that the MWD in a GPC curve exhibits two component polymers wherein one component polymer may even exist as a hump, shoulder or tail relative to the MWD of the other component polymer. A bimodal MWD can be deconvoluted into two primary components: a high molecular weight (HMW) ethylene-based polymer fraction and a low molecular weight (LMW) ethylene-based polymer fraction. As described further below, the HMW fraction may have a higher number-averaged molecular weight (Mn) according to GPC and a higher or lower α-olefin comonomer content than the LMW fraction. After deconvolution, the Mn and weight-average molecular weight (Mw) of each component can be obtained.

Multimodal Elastomer

In one or more embodiments, the multimodal elastomer may comprise 20 to 90% by weight of the HMW fraction, wherein the HMW fraction has an Mn of at least 50 kg/mol, when measured according to GPC. In further embodiments, the multimodal elastomer may comprise 30 to 90 wt %, or 50 to 85 wt %, or 50 wt % to 70 wt % of the HMW fraction. Moreover, in further embodiments, the HMW fraction may have an Mn above 75 kg/mol, or above 100 kg/mol, or above 150 Kg/mol, or above 200 kg/mol. Said another way, suitable ranges for the HMW fraction molecular weight include 50 kg/mol to 600 kg/mol, or 100 kg/mol to 400 kg/mol, or 150 kg/mol to 300 kg/mol.

The multimodal elastomer may comprise an LMW fraction having an Mn of 4 to 25 kg/mol. In further embodiments, the LMW fraction may be from 5 kg/mol to 25 kg/mol, or from 7 kg/mol to 25 kg/mol, or from 10 kg/mol to 20 kg/mol. Moreover, the multimodal elastomer may include 10 to 70 wt %, or 20 to 60 wt %, or 30 to 50 wt % of the LMW fraction.

In one or more embodiments, the ratio of the Mn of HMW fraction to the Mn of the LMW fraction is at least 5 to 1, or at least 8 to 1, or at least 10 to 1. Without being bound by theory, the higher Mn of the HMW fraction and the lower Mn of the LMW fraction ensures that the multimodal elastomer may improve the impact modifying properties of the TPO while also ensuring good processibility when blending in the TPO and during TPO processes, such as injection molding. The impact modification properties of the multimodal elastomer may be attributed in large part to the higher Mn of the HMW fraction, while the processing benefits of the multimodal elastomer are largely attributable to the LMW fraction. As will be illustrated further below, the mixed catalyst system causes the desired variance in Mn between the LMW and HMW fractions.

As stated above, the multimodal elastomer comprises ethylene and an α-olefin comonomer in polymerized form. Suitable α-olefin comonomers may include those containing 3 to 20 carbon atoms ($C_3$-$C_{20}$). In some embodiments, the α-olefin may be a $C_4$-$C_{20}$ α-olefin, a $C_4$-$C_{12}$ α-olefin, a $C_3$-$C_{12}$ α-olefin, a $C_3$-$C_{10}$ α-olefin, a $C_3$-$C_8$ α-olefin, a $C_4$-$C_8$ α-olefin, or a $C_6$-$C_8$ α-olefin. In some embodiments, the α-olefin comonomers are selected from the group consisting of propylene, 1-butene, 1-pentene, 1-hexene, 4-methyl-1-pentene, 1-heptene, 1-octene, 1-nonene and 1-decene. In a specific embodiment, the α-olefin comonomer is 1-octene.

Various incorporation levels of α-olefin comonomer are contemplated for the HMW fraction and the LMW fraction. As discussed further below, the degree of α-olefin comonomer incorporation depends on the mixed catalyst system used i.e., the constrained geometry complex (CGC) catalyst, which primarily drives olefin polymerization of the LMW fraction, and the bisphenyl phenol (BPP) catalyst, which primarily drives olefin polymerization of the HMW fraction. In one or more embodiments, the HMW fraction may comprise at least 30% by weight of the α-olefin comonomer, or at least 40% by weight of the α-olefin comonomer. In other embodiments, the LMW fraction may comprise at least 29% by weight α-olefin comonomer, or at least at least 35% by weight of the α-olefin comonomer. In further embodiments, the HMW fraction and the LMW fraction may each include less than 50% by weight of the α-olefin comonomer.

Various incorporation levels are also contemplated for the HMW fraction. For example, the HMW fraction may include at least 35% by weight ethylene monomer, or at least 50% by weight ethylene monomer, or at least 60% by weight, or at least 70% by weight. In other embodiments, the LMW fraction may include at least 50% by weight of ethylene monomer, or at least 60% by weight of ethylene monomer, or at least 70% by weight of ethylene monomer.

In further embodiments, the percent by weight of the α-olefin comonomer incorporated in the HMW fraction is greater than the percent by weight of the α-olefin comonomer incorporated in the LMW fraction. Moreover, the percent by weight of the α-olefin comonomer in the HMW fraction is at least 4% by weight greater, or at least 5% by weight greater, or at least 10% by weight greater, or at least 15% by weight greater than the percent by weight of the α-olefin comonomer in the LMW fraction. While the multimodal elastomer may be produced in single or dual reactors, dual reactor systems may achieve a greater difference between the amount of α-olefin comonomer incorporated in the HMW fraction versus the amount of α-olefin comonomer incorporated in the LMW fraction.

In one or more embodiments, the multimodal elastomer may have a density less than 0.900 g/cc measured according to ASTM D792. In further embodiments, the multimodal elastomer has a density between 0.850 to 0.880 g/cc, or 0.853 to 0.875 g/cc, or 0.860 to 0.875 g/cc.

Demonstrating the desired rheology and processibility, the multimodal elastomer may have a shear viscosity at 0.1 rad/s (V0.1) of less than 120,000 Pa·s, or less than 90,000 Pa·s, or less than 60,000 Pa·s and a shear viscosity at 100 rad/s (V100) of less than 2500 Pa·s, or less than 2000 Pa·s, or less than 1200 Pa·s. To reiterate, the above-described multimodal elastomer will provide the desired rheology for dispersion in the TPO and the desired injection molding processability of the TPO as demonstrated by the low shear and high shear viscosity.

Methods of Making the Multimodal Elastomer

As stated above, the multimodal elastomer is produced by olefin polymerization with a mixed catalyst system. As used herein, "mixed catalyst" means that a combination of catalysts are used, specifically, a constrained geometry complex (CGC) catalyst and a biphenyl phenol (BPP) catalyst; however, there is no requirement that the CGC and BPP catalyst are blended together or even included in the same reactor. The multimodal elastomer may be manufactured by any number of methods including in-situ in a single reactor or cascading reactors in series, or by post-reactor blending. Various polymerization processes may be utilized, for example, solution polymerization, using one or more conventional reactors e.g., loop reactors, isothermal reactors, stirred tank reactors, batch reactors in parallel, series, and/or any combinations thereof.

In one embodiment, the method of making the multimodal elastomer comprises adding to a reactor system the ethylene monomer and at least one α-olefin comonomer in the presence of a biphenyl phenol (BPP) complex catalyst and a constrained geometry complex (CGC) catalyst, and producing the multimodal elastomer via solution polymerization at a temperature of at least 100° C. As used herein, "reactor system" may mean a single reactor or multiple reactors in series or in parallel. In a single reactor embodiment, the ethylene, the at least one α-olefin comonomer and the CGC and BPP catalysts are added to a single reactor, and the solution polymerization produces the multimodal elastomer in that single reactor. Multiple reaction methodologies are contemplated for the dual reactor embodiments. For example, it is contemplated that the reactors may arranged be in parallel such, that the ethylene, the at least one α-olefin comonomer and the BPP catalyst is used to produce the HMW fraction in one reactor, while the ethylene, the at least one α-olefin comonomer and the CGC catalyst is used to produce the LMW fraction in a second reactor. Subsequently, the LMW and HMW fractions are combined in one of the reactors to produce the multimodal elastomer.

Various embodiments are contemplated for the CGC catalyst. As would be familiar to the skilled person, the constrained geometry catalyst is a multi-component catalyst system comprising a CGC procatalyst and a cocatalyst, and other optional ingredients. As used herein, CGC procatalysts may be described as having a metal coordination complex comprising a metal of groups 3-10 or the Lanthanide series of the Periodic Table of the Elements and a delocalized n-bonded moiety substituted with a constrain-inducing moiety. The complex has a constrained geometry about the metal atom such that the angle at the metal between the centroid of the delocalized, substituted n-bonded moiety and the center of at least one remaining substituent is less than such angle in a similar complex containing a similar n-bonded moiety lacking in such constrain-inducing substituent.

Further, the CGC procatalyst may be defined by a metal complex of Formula I:

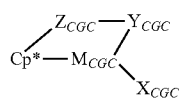

(Formula I)

wherein $M_{CGC}$ is a metal of group 3-10 or the Lanthanide series of the Periodic Table of the Elements; Cp* is a cyclopentadienyl or substituted cyclopentadienyl group bound in an η5 bonding mode to $M_{CGC}$;

$Z_{CGC}$ is a moiety comprising boron, or a member of group 14 of the Periodic Table of the Elements;

$X_{CGC}$ independently each occurrence is an anionic ligand group or neutral Lewis base ligand group having up to 30 non-hydrogen atoms; n is 0, 1, 2, 3, or 4 and is 2 less than the valence of $M_{CGC}$; and $Y_{CGC}$ is an anionic or nonanionic ligand group bonded to $Z_{CGC}$ and $M_{CGC}$ comprising nitrogen, phosphorus, oxygen or sulfur and having up to 20 non-hydrogen atoms.

Cocatalysts are often called activating cocatalysts, because the complex of formula (I) may be activated by combination with one or more cocatalysts such as a cation forming cocatalyst, a strong Lewis acid, or a combination thereof. Suitable cocatalysts may include alkyl aluminums, polymeric or oligomeric aluminoxanes, as well as inert, compatible, noncoordinating, ion forming compounds. Examples of polymeric or oligomeric alumoxanes may include methylalumoxane, triisobutylaluminum-modified methylalumoxane, and isobutylalumoxane. In one or more specific embodiments, exemplary suitable cocatalysts may include, but are not limited to modified methyl aluminoxane (MMAO), bis(hydrogenated tallow alkyl)methyl, tetrakis (pentafluorophenyl)borate(1-) amine (RIBS-2), or combinations thereof.

Further details and examples of CGC catalysts are provided in U.S. Pat. Nos. 5,272,236, 5,278,272, 6,812,289, and WO Publication 93/08221, which are all incorporated herein by reference in their entirety.

Various embodiments are also contemplated for the bisphenyl phenol (BPP) catalyst Like the CGC catalyst, the BPP catalyst is a multi-component catalyst system comprising a cocatalyst and an activating cocatalyst, as well as further optional ingredients. The BPP procatalyst may comprise a metal complex as shown in Formula II as follows:

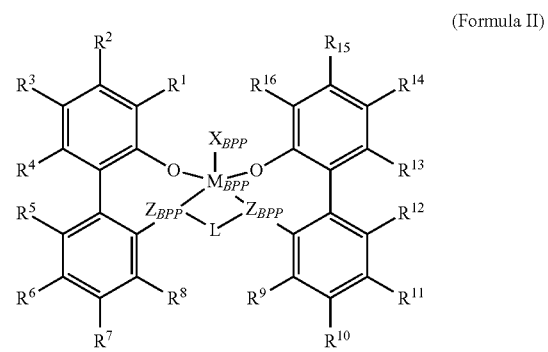

(Formula II)

wherein $M_{BPP}$ is titanium, zirconium, or hafnium, each independently being in a formal oxidation state of +2, +3, or +4; and n is an integer of from 0 to 3, and wherein when n is 0, $X_{BPP}$ is absent; and each $X_{BPP}$ independently is a monodentate ligand that is neutral, monoanionic, or dianionic; or two $X_{BPP}$ are taken together to form a bidentate ligand that is neutral, monoanionic, or dianionic; and $X_{BPP}$ and n are chosen in such a way that the metal-ligand complex of formula (I) is, overall, neutral; and each $Z_{BPP}$ independently is O, S, $N(C_1-C_{40})$hydrocarbyl, or $P(C_1-C_{40})$ hydrocarbyl; and L is $(C_2-C_{40})$hydrocarbylene or $(C_2-C_{40})$ heterohydrocarbylene, wherein the $(C_2-C_{40})$ hydrocarbylene has a portion that comprises a 2-carbon atom to 10-carbon atom linker backbone linking the Z atoms in formula (I) (to which L is bonded) and the $(C_2-C_{40})$ heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O), $S(O)_2$, $Si(R^C)_2$, $Ge(R^C)_2$, $P(R^P)$, or $N(R^N)$, wherein independently each $R^C$ is selected from the group consisting of $(C_1-C_{40})$hydrocarbyl, each $R^P$ is $(C_1-C_{40})$hydrocarbyl; and each $R^N$ is $(C_1-C_{40})$hydrocarbyl or absent; and $R^{1-16}$ are each independently selected from the group consisting of a $(C_1-C_{40})$hydrocarbyl, $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, $CN$, $CF_3$, $R^CS(O)$—, $R^CS(O)_2$—, $(R^C)_2C$=N—, $R^CC(O)O$—, $R^COC(O)$—, $R^CC(O)N(R)$—, $(R^C)_2NC(O)$—, halogen atom, hydrogen atom, and any combination thereof.

In further embodiments, at least one of the $R^1$-$R^{16}$ sites may be substituted with an $Si(Y_1)(Y_2)(Y_3)$ group; $Y_1$ is a $(C_3-C_{40})$hydrocarbyl or $(C_2-C_{40})$heterohydrocarbyl; $Y_2$ is a $(C_1-C_{40})$hydrocarbyl or $(C_1-C_{40})$heterohydrocarbyl; $Y_3$ is a $(C_1-C_{40})$hydrocarbyl or $(C_1-C_{40})$heterohydrocarbyl, with the further proviso that $Y_1$, $Y_2$ and $Y_3$ are not all isopropyl groups; and each of the hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C$=N—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R^2C$=N—, $NC$—, $RC(O)O$—, $ROC(O)$—, $RC(O)N(R)$—, or $R_2NC(O)$—, or two of the $R^S$ are taken together to form an unsubstituted $(C_1-C_{18})$hydrocarbylene wherein each R independently is an unsubstituted $(C_1-C_{18})$hydrocarbyl.

Within the mixed catalyst system, the BPP catalyst may include the same cocatalyst as the CGC or a different cocatalyst. Suitable BPP cocatalysts may be selected from the list of cocatalysts provided above.

Further details and examples of BPP catalysts are provided in U.S. Publication Nos. 2015/0344602, 2015/0337063, and 2015/0337062, as well as U.S. Pat. No. 9,000,108, which are all incorporated herein by reference in their entirety.

Thermoplastic Olefin

As stated above, the present multimodal elastomers are incorporated into thermoplastic olefins (TPO) as impact modifiers. In accordance with the present disclosure, the TPO comprises the multimodal elastomer, polypropylene, and optional additional embodiments, such as additional elastomers, block composites, fillers, or combinations.

Various amounts are contemplated for the multimodal elastomer within the TPO. In one or more embodiments, the TPO may comprise 10 to 40 wt %, or 15 to 30 wt % of multimodal elastomer, or 16 to 27 wt %, or 18 to 25 wt %, based on total weight of the TPO composition.

Polypropylene

The polypropylene of the TPO is a matrix polymer toughened via blending with the multimodal elastomer composition. Various polypropylene compositions are considered suitable. The polypropylene polymer base may include polypropylene in the isotactic form of a homopolymer polypropylene and/or other forms of polypropylene can also be used (e.g., syndiotactic or atactic). The propylene polymer base may include a random copolymer polypropylene that has an ethylene content from 0.5 wt % to 5.0 wt %, based on the total weight of the random copolymer polypropylene. The propylene polymer base may include 95 wt % to 100 wt % of the random copolymer polypropylene based on the total weight of the propylene polymer base. The polypropylene polymer base may include an impact copolymer, which includes a rubber phase dispersed in propylene. The molecular weight and hence the melt flow rate of the polypropylene used may vary depending upon the application. A discussion of various polypropylene polymers is contained in, e.g., Modern Plastics Encyclopedia/89, mid October 1988 Issue, Volume 65, Number 11, pp. 86-92.

The propylene polymer base may include clarifying and/or nucleating agents therewithin. For example, clarifying and/or nucleating agents may alter the way polypropylene chains crystallize and agglomerate in a molten state. These agents may increase the onset of crystallization temperature. Clarifying agents (or clarifiers) are usually organic, non-polymeric molecules. The clarifying agents generally also may act as nucleating agents, but nucleating agents are not necessarily clarifying agents. Exemplary clarifiers may include chemical derivatives of dibenzylidene sorbitol and have melting temperatures within the processing window of polypropylene resins. Nucleating agents generally are inorganic materials with a small average particle size and a high melting point. When a nucleated resin is melted in an extruder, the nucleating agent may typically remain solid and provide a site around which polypropylene spherulites can form. Exemplary nucleating agents are chemical derivatives of benzoic acid. For example, the nucleating agent may be sodium benzoate, kaolin, and/or talc.

Specific TPO embodiments may include the multimodal elastomer blended with polypropylene and a block composite compatibilizer as detailed below. In such embodiments, the polypropylene may be in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference.

The molecular weight and hence the melt flow rate of the polypropylene for use in the present disclosure varies depending upon the application. The melt flow rate (MFR) for the polypropylene useful herein is generally from about 0.1 grams/10 minutes (g/10 min) to about 200 g/10 min, preferably from about 0.5 g/10 min to about 150 g/10 min, and especially from about 4 g/10 min to about 100 g/10 min when measured at 230° C. at a load of 2.16 kg according to ASTM D1238. As stated above, the propylene polymer can be a polypropylene homopolymer, or it can be a random copolymer or even an impact copolymer (which already contains a rubber phase). Examples of impact copolymers include Pro-fax SD242 from LyondellBasell Industries or YUPLENE BX3900 from SK Global Chemical. Examples of suitable homopolymers include H734-52RNA from Braskem or Adstif HA801U from LyondellBasell Industries. Examples of random copolymers include 6D43 from Braskem, and suitable random propylene-ethylene plastomers and elastomers may include VISTAMAXX™ (made by ExxonMobil), and VERSIFY™ from The Dow Chemical Co., Midland, Mich.

Various amounts of polypropylene are contemplated in the TPO. For example, the TPO may include 30 to 85 wt %, or 40 to 85 wt %, or 50 to 85 wt %, or 50 to 80 wt %.

Block Composite Compatibilizer

In the manufacture of TPOs, block composites or block composite compatibilizer are used to combine the multimodal elastomer, the polypropylene, and other optional components (e.g., additional elastomers). The block composite may enhance dispersion of the multimodal elastomer in the polypropylene matrix.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In one embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the disclosure are characterized by unique distributions of both polymer polydispersity (PDI or Mw/Mn) and block length distribution, due, in a preferred embodiment, to the effect of a shuttling agent(s) in combination with the catalyst(s).

The term "block composite" refers to polymers comprising a soft copolymer, a hard polymer, and a block copolymer, for example a diblock, having a soft segment and a hard segment, wherein the hard segment of the block copolymer is essentially the same composition as the hard polymer in the block composite and the soft segment of the block copolymer is essentially the same composition as the soft copolymer of the block composite. The block copolymers can be linear or branched.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all monomer (e.g., propylene units).

"Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

Various olefins are contemplated for the monomer and additional comonomers of the block composite. In one embodiment, the monomer is propylene, and the additional comonomer is ethylene.

In particular, in the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points ($T_m$) that are above 80° C., or above 100° C., or above 115° C., or above 120° C. Additionally, the block composites preferably have a $T_m$ greater than 100° C., preferably greater than 120° C., and more preferably greater than 125° C. Preferably the MFR of the block composite is from 0.1 to 1000 dg/min, more preferably from 0.1 to 50 dg/min and more preferably from 0.1 to 30 dg/min. Further, the block composites of this embodiment of the disclosure have a weight average molecular weight (Mw) from 10,000 to about 2,500,000, preferably from 35000 to about 1,000,000 and more preferably from 50,000 to about 300,000, preferably from 50,000 to about 200,000.

The block composite polymers of the invention may be differentiated from conventional, random copolymers, physical blends of polymers, and block copolymers prepared via sequential monomer addition. The block composites may be differentiated from: 1) random copolymers by characteristics such as higher melting temperatures for a comparable amount of comonomer, block index and block composite index, as described below; 2) a physical blend by characteristics such as block index, block composite index, better tensile strength, improved fracture strength, finer morphology, improved optics, and greater impact strength at lower temperature; and 3) block copolymers prepared by sequential monomer addition by molecular weight distribution, rheology, shear thinning, rheology ratio, and in that there is block polydispersity.

The block composites may be defined by a Block Composite Index (BCI). The term BCI is herein defined to equal the weight percentage of the block copolymer divided by 100% (i.e. weight fraction). The value of the block composite index can range from 0 up to 1.0, whereas 1.0 would be equal to 100% of the block copolymer and zero would be for a material such as a traditional blend or random copolymer. Said in another way, for an insoluble fraction, the BCI is 1.000, and for a soluble fraction the BCI is assigned a value of zero. In one or more embodiment, the BCI may be less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4, or from about 0.4 to about 0.5. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

In particular, the BCI is based on showing that insoluble fractions contain an appreciable amount of ethylene that would not otherwise be present if the polymer were simply a blend of iPP homopolymer (i.e., the hard segment) the and ethylene-propylene (EP) copolymer (i.e., the soft segment). To account for this "extra ethylene", a mass balance calculation can be performed to estimate a block composite index from the amount of xylene insoluble and soluble fractions and the weight % ethylene present in each of the fractions. To account for this "extra ethylene," a mass balance calculation can be performed to estimate a block composite index from an amount of xylene insoluble and soluble fractions and a weight % ethylene present in each of the fractions.

A summation of the weight % ethylene from each fraction according to Equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Equation 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard segment and weight % EP soft segment can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% } C_{2_{Overall\ or\ xylene\ insoluble}} = \quad \text{Equation 2}$$
$$w_{iPPHard}(\text{wt \% } C_{2_{iPP}}) + w_{EP\ soft}(\text{wt \% } C_{2_{EPSoft}})$$

$$w_{iPPhard} = \frac{\text{wt \% } C_{2_{overall\ or\ xyleneinsoluble}} - \text{wt \% } C_{2_{EPSoft}}}{\text{wt \% } C_{2_{iPPhard}} - \text{wt \% } C_{2_{EPSoft}}} \quad \text{Equation 3}$$

$$w_{EPSoft} = 1 - w_{iPPHard} \quad \text{Equation 4}$$

After accounting for the "extra ethylene" present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it may reduce the possibility of and/or prevent the EP block from solubilizing.

To estimate the BCI, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an iPP-EP polymer contains an overall of 47 wt % $C_2$ and is made under the conditions to produce an EP soft polymer with 67 wt % $C_2$ and an iPP homopolymer containing zero ethylene, the amount of EP soft and iPP hard is 70 wt % and 30 wt %, respectively. If the percent of EP is 70 wt % and the iPP is 30 wt %, the relative ratio of the EP:iPP blocks could be expressed as 2.33:1. Hence, if one skilled in the art, carries out a xylene extraction of the polymer and recovers 40 wt % insoluble and 60 wt % soluble, this would be an unexpected result and this would lead to the conclusion that a fraction of the block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

The block composite and crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent. The process is characterized by formation of at least some of the growing polymer chains under differentiated process conditions in two or more reactors operating under steady state polymerization conditions or in two or more zones of a reactor operating under plug flow polymerization conditions. In a specific embodiment, the block composites of the disclosure comprise a fraction of block polymer which possesses a most probable distribution of block lengths.

Suitable processes useful in producing the block composites and crystalline block composites may be found, for example, in U.S. Publication No. 2008/0269412, published on Oct. 30, 2008, which is herein incorporated by reference in its entirety. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When the block composites are produced in a continuous process, the block composites may possess PDI from 1.7 to 15, or from 1.8 to 3.5, or from 1.8 to 2.2, or from 1.8 to 2.1. When produced in a batch or semi-batch process, the block composites may possess PDI values from 1.0 to 2.9, or from 1.3 to 2.5, or from 1.4 to 2.0, or from 1.4 to 1.8. Such block composites are described in, for example, U.S. Publication Nos. 2011/0082257, 2011/0082258 and 2011/0082249, all of which are incorporated herein by reference with respect to descriptions of the block composites, processes to make them and methods of analyzing them.

In one embodiment, the block composite is present in an amount of 2 wt % to 15 wt %, preferably 2 wt % to 10 wt % and more preferably from 2 wt % to 5 wt %, based on total weight of the TPO.

Additives and Fillers

Optional additives such as antioxidants (e.g., hindered phenolics (e.g., Irganox™ 1010), phosphites (e.g., Irgafos™ 168)), cling additives (e.g., PIB), antiblock additives, pigments, fillers (e.g., talc, diatomaceous earth, nano-fillers, clay, metal particles, glass fibers or particles, carbon black, other reinforcing fibers, etc.), and the like can also be included in the formulations. Preferably, the compositions comprise talc in an amount of 0 to 30 wt %, or 0 to 20 wt %, or 5-20 wt % based on the total weight of the TPO. In some embodiments, desirable TPOs are produced without the inclusion of talc. Other additives may be present in amounts of from 0.01 to 1 wt %.

General Article Fabrication

The TPO compositions of this disclosure can be fabricated into parts, sheets or other article of manufacture, using any conventional extrusion, calendering, blow molding (e.g., that described in Modern Plastics Encyclopedia/89, Mid October 1988 Issue, Volume 65, Number 11, pp. 217-218, "Extrusion-Blow Molding", the disclosure of which is incorporated herein by reference), injection molding, (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", the disclosures of which are incorporated herein by reference), foaming or thermoforming process. Specific examples of such processes include sheet extrusion, profile extrusion, and injection molding. Such processes can produce articles or products having smooth or embossed surfaces. The components of the composition can be fed to the process either pre-mixed, or, the components can be fed directly into the process equipment, such as a converting extruder, such that the composition is formed in the extruding, calendering, blow molding, foaming or thermoforming process. The compositions also may be blended with another polymer, prior to fabrication of an article. Such blending may occur by any of a variety of conventional techniques, one of which is dry blending of pellets of the thermoplastic elastomer compositions of this invention with pellets of another polymer.

A partial, far from exhaustive, listing of articles that can be fabricated from the compositions of the invention includes automobile body parts, such as instrument panels, instrument panel foam, fuel tanks, automotive containers, bumper fascia, body side moldings, automotive structural ribbing, interior pillars, exterior trim, interior trim, air dams, air ducts, grills and wheel covers, and non-automotive applications, such as polymer films, polymer sheets, foams, tubing, fibers, coatings, trash cans, storage or packaging containers, including, for example, freezer containers. Of course, one skilled in the art can also combine polymers to advantageously use refractive index to improve, or maintain clarity of end use articles, such as freezer containers.

Additional articles include lawn furniture, lawn mower and other garden appliance parts, refrigerator and other home appliance parts, recreational vehicle parts, golf cart parts, utility cart parts, desk edging, toys and water craft parts. The compositions can also be used in roofing applications such as roofing articles. The compositions can further be used in building applications such as plastic lumber, decking, siding, fascia, soffit, and other building interior and exterior trim articles. The compositions can further be used in fabricating components of footwear. The compositions can further be used in fabricating components of hand held electronic devices such as cellular telephones, personal digital players, personal digital assistants, etc. A skilled artisan can readily augment this list without undue experimentation. Additional articles include extrusion profiles.

Examples

The following examples illustrate one or more additional features of the present disclosure described above. The materials used in the processes for making the following multimodal elastomers, block composites, and thermoplastic olefins are provided in Table 1 below. Additionally, Table 1 lists comparative monomodal elastomers, which were also studied.

TABLE 1

Materials

| Product name or abbreviation | Properties | Product Supplier |
| --- | --- | --- |
| Comparative Monomodal Elastomers | | |
| ENGAGE ™ 8842 | Ethylene/1-octene random copolymer having $I_2$ of 1 (190° C., 2.16 kg) and density of 0.857 g/cc | The Dow Chemical Company, Midland, MI |
| ENGAGE ™ 8100 | Ethylene/1-octene random copolymer having $I_2$ of 1 (190° C., 2.16 kg) and density of 0.870 g/cc | The Dow Chemical Company, Midland, MI |
| ENGAGE ™ 8200 | Ethylene/1-octene random copolymer having $I_2$ of 5 and density of 0.870 g/cc | The Dow Chemical Company, Midland, MI |
| Catalysts | | |
| BPP-A | Hafnium, dimethyl[[2',2'''-[1,4-butanediylbis(oxy-.kappa.O)]bis[3-[3,6-bis(1,1-dimethylethyl)-9H-carbazol-9-yl]-5'-fluoro-5-(1,1,3,3-tetramethylbutyl)[1,1'-biphenyl]-2-olato-.kappa.O]](2-)]-, | N/A |

TABLE 1-continued

Materials

| Product name or abbreviation | Properties | Product Supplier |
|---|---|---|
| BPP-B | Hafnium, [[rel-2',2'''-[(1R,2R)-1,2-cyclohexanediylbis(methyleneoxy-.kappa.O)]bis[3-(9H-carbazol-9-yl)-5-methyl[1,1'-biphenyl]-2-olato-.kappa.O]](2-)dimethyl-, | N/A |
| BPP-C | Hafnium, [[2',2'''-[1,3-propanediylbis(oxy-.kappa.O)]bis[3-[3,6-bis(1,1-dimethylethyl)-9H-carbazol-9-yl]-5'-fluoro-5-(1,1,3,3-tetramethylbutyl)[1,1'-biphenyl]-2-olato-.kappa.O]](2-)]dimethyl-, | N/A |
| BPP-D | Hafnium, dimethyl[[2',2'''-[1,3-propanediylbis(oxy-.kappa.O)]bis[3-[3,6-bis(1,1-dimethylethyl)-9H-carbazol-9-yl]-3',5'-difluoro-5-(1,1,3,3-tetramethylbutyl)[1,1'-biphenyl]-2-olato-.kappa.O]](2-)]- | N/A |
| CGC-A | Titanium, [N-(1,1-dimethylethyl)-1,1-dimethyl-1-[(1,2,3,4,5-.eta.)-2,3,4,5-tetramethyl-2,4-cyclopentadien-1-yl]silanaminato(2-)-.kappa.N1][(1,2,3,4-.eta.)-1,3-pentadiene]- | N/A |
| CGC-B | Titanium, [N-(1,1-dimethylethyl)-1,1-dimethyl-1-[(1,2,3,3a,7a-h)-3-(1-pyrrolidinyl)-1H-inden-1-yl]silanaminato(2-)-.kappa.N][(1,2,3,4-h)-1,3-pentadiene]- | N/A |
| CGC-C | Titanium, [N-(1,1-dimethylethyl)-1,1-dimethyl-1-[(1,2,3,3a,8a-.eta.)-1,5,6,7-tetrahydro-2-methyl-s-indacen-1-yl]silanaminato(2-)-.kappa.N][(1,2,3,4-.eta.)-1,3-pentadiene]- | N/A |
| Cocatalysts | | |
| Cocatalyst-1 | A mixture of methyldi($C_{14-18}$ alkyl)ammonium salts of tetrakis(pentafluorophenyl)borate, prepared by reaction of a long chain trialkylamine (Armeen ™ M2HT, available from Akzo-Nobel, Inc.), HCl and Li[B($C_6F_5$)$_4$], substantially as disclosed in USP 5,919,983, Ex. 2 (no further purification performed) | Boulder Scientific |
| Cocatalyst-2 | Modified methylalumoxane (MMAO) Type 3A (no further purification performed) | Akzo Nobel |
| Cocatalyst-3 | Tris(pentafluorophenyl)borane | N/A |
| Additional Components | | |
| ISOPAR ®E | Hydrocarbon solvent for the polymerization reactions further purified through beds of 13-X molecular sieves prior to use. | ExxonMobil Chemical Company |
| Braskem PP H734-52RNA | 52 MFR (230° C., 2.16 kg) homopolymer polypropylene | Braskem |
| Yuplene BX3900 | 60 MFR (230° C., 2.16 kg) impact copolymer polypropylene | SK Global Chemical |
| Jetfil ® 700C | Talc with median particle size of approximately 1.5 micron | Imerys Talc |
| Irganox ® B225 | Antioxidant | BASF Dispersion & Pigments Division |
| CSA-1 (Chain shuttling agent) | Diethylzinc or DEZ | |

Preparation of Multimodal Elastomers

The multimodal elastomers were prepared using a either a dual reactor or a single reactor. These reactors were hydraulically full and operated at steady state conditions. The catalysts and cocatalysts used to produce the multimodal elastomers are listed in Table 2 as follows. The inventive multimodal elastomers were prepared using the combination of a first catalyst comprising a biphenyl phenol complex and a second catalyst comprising a constrained geometry complex. A comparative multimodal elastomer, Comp C, was prepared using a combination of two biphenyl phenol complex catalysts in a single reactor. For the single reactor multimodal elastomers, the ethylene and octene monomers, the solvent, hydrogen, catalysts, and cocatalysts are fed to the reactor according to the process conditions outlined in Tables 3 and 4 to produce the multimodal elastomers. Multimodal Examples 1-4 and the Comparative Multimodal Examples (Comp A, Comp B, and Comp C) were prepared in a continuous stirred tank reactor. Multimodal Examples 5-9 were produced in a loop reactor.

In addition to the single reactor multimodal elastomers detailed above, Table 5 provides processing conditions for multimodal elastomers prepared using two reactors connected in parallel. Here, each reactor was hydraulically full and operated at steady state conditions. The ethylene and octene monomers, solvent (ISOPAR®E), hydrogen, BPP-B catalyst, cocatalyst-1 and cocatalyst-2 were fed to the first reactor (loop reactor) according to the process conditions outlined in Table 5. Additional ethylene and octene monomers, solvent, hydrogen, CGC-A catalyst, cocatalyst-2, and cocatalyst-3, were added to the second reactor (continuous stirred tank reactor) according to the process conditions outlined in Table 5. The contents of both reactors are combined and then the solvent is removed to produce the multimodal elastomer.

The multimodal elastomer properties are described in Table 6.

TABLE 2

Catalysts and Cocatalysts Used for Producing Multimodal Elastomers

| Name | Description | CGC Catalyst | BPP Catalyst | Cocatalyst(s) |
|---|---|---|---|---|
| Example 1 | Elastomer Produced via CGC and BPP Catalyst in Single Reactor | CGC-A | BPP-A | Cocatalyst-1, Cocatalyst-2 |
| Comp A | Comparative Elastomers Produced via CGC and BPP Catalyst in Single Reactor | CGC-B | BPP-A | Cocatalyst-1, Cocatalyst-2 |
| Comp B | Comparative Elastomers Produced via CGC and BPP Catalyst in Single Reactor | CGC-C | BPP-A | Cocatalyst-1, Cocatalyst-2 |
| Example 2 | Elastomer Produced via CGC and BPP Catalyst in Single Reactor | CGC-C | BPP-A | Cocatalyst-1, Cocatalyst-2 |
| Example 3 | Elastomer Produced via CGC and BPP Catalyst in Single Reactor | CGC-C | BPP-A | Cocatalyst-1, Cocatalyst-2 |
| Example 4 | Elastomer Produced via CGC and BPP Catalyst in Single Reactor | CGC-A | BPP-B | Cocatalyst-1, Cocatalyst-2 |
| Example 5 | Elastomer Produced via CGC and BPP Catalyst in Single Reactor | CGC-A | BPP-B | Cocatalyst-1, Cocatalyst-2 |
| Example 6 | Elastomer Produced via CGC and BPP Catalyst in Single Reactor | CGC-A | BPP-B | Cocatalyst-1, Cocatalyst-2 |
| Example 7 | Elastomer Produced via CGC and BPP Catalyst in Single Reactor | CGC-A | BPP-B | Cocatalyst-1, Cocatalyst-2 |
| Example 8 | Elastomer Produced via CGC and BPP Catalyst in Single Reactor | CGC-A | BPP-B | Cocatalyst-1, Cocatalyst-2 |
| Example 9 | Elastomer Produced via CGC and BPP Catalyst in Single Reactor | CGC-A | BPP-B | Cocatalyst-1, Cocatalyst-2 |
| Example 10 | Elastomer Produced via CGC and BPP Catalyst in Dual Reactor | CGC-A | BPP-B | Cocatalyst-1, Cocatalyst-2, Cocatalyst-3 |
| Example 11 | Elastomer Produced via CGC and BPP Catalyst in Dual Reactor | CGC-A | BPP-B | Cocatalyst-1, Cocatalyst-2, Cocatalyst-3 |
| Example 12 | Elastomer Produced via CGC and BPP Catalyst in Dual Reactor | CGC-A | BPP-B | Cocatalyst-1, Cocatalyst-2, Cocatalyst-3 |
| Comp C | Elastomer Produced via two BPP Catalysts in Single Reactor | — | BPP-C, BPP-D | Cocatalyst-1, Cocatalyst-2 |

TABLE 3

Process Conditions for Dual Catalyst, Single Reactor Multimodal Elastomers-Part 1

| Name | Cat-1 | Cat-1 Metal conc ppm metal | Cat-1 Soln flow lbs/h | Cat-2 | Cat-2 Metal conc ppm metal | Cat-2 Soln flow lbs/h | Cocat-1 conc ppm cocat | Cocat-1 soln flow lbs/h | Cocat-2, Al Conc Ppm | Cocat-2, Al Soln flow lbs/h |
|---|---|---|---|---|---|---|---|---|---|---|
| Ex. 1 | BPP-A | 0.9 | 0.204 | CGC-A | 5.4 | 0.110 | 141 | 0.148 | 31.7 | 0.216 |
| Comp A | BPP-A | 13.0 | 0.096 | CGC-B | 0.3 | 0.124 | 56.2 | 0.213 | 31.7 | 0.192 |
| Comp B | BPP-A | 13.0 | 0.194 | CGC-C | 0.9 | 0.326 | 225.6 | 0.139 | 31.3 | 0.18 |
| Ex. 2 | BPP-A | 7.8 | 0.350 | CGC-C | 14.0 | 0.145 | 225.6 | 0.397 | 31.3 | 0.179 |
| Ex. 3 | BPP-A | 26.0 | 0.199 | CGC-C | 14.0 | 0.176 | 225.6 | 0.554 | 31.3 | 0.194 |
| Ex. 4 | BPP-B | 1.2 | 0.106 | CGC-A | 4.6 | 0.077 | 113.2 | 0.109 | 31.3 | 0.174 |
| Ex. 5 | BPP-B | 49.9 | 1.650 | CGC-A | 100.0 | 0.803 | 9990 | 0.454 | 476 | 1.461 |
| Ex. 6 | BPP-B | 49.9 | 0.868 | CGC-A | 100.0 | 0.264 | 9990 | 0.183 | 476 | 0.579 |

TABLE 3-continued

Process Conditions for Dual Catalyst, Single Reactor Multimodal Elastomers-Part 1

| Name | Cat-1 | Cat-1 Metal conc ppm metal | Cat-1 Soln flow lbs/h | Cat-2 | Cat-2 Metal conc ppm metal | Cat-2 Soln flow lbs/h | Cocat-1 conc ppm cocat | Cocat-1 soln flow lbs/h | Cocat-2, Al Conc Ppm | Cocat-2, Al Soln flow lbs/h |
|---|---|---|---|---|---|---|---|---|---|---|
| Ex. 7 | BPP-B | 49.9 | 0.890 | CGC-A | 100.0 | 0.263 | 9990 | 0.182 | 476 | 0.577 |
| Ex. 8 | BPP-B | 49.9 | 0.940 | CGC-A | 24.9 | 0.372 | 2996 | 0.412 | 476 | 0.397 |
| Ex. 9 | BPP-B | 49.9 | 1.077 | CGC-A | 24.9 | 0.691 | 2996 | 0.561 | 476 | 0.538 |
| Comp C | BPP-C | 2.9 | 0.220 | BPP-D | 12.0 | 0.230 | 134 | 0.430 | 30 | 0.340 |

TABLE 4

Process Conditions for Dual Catalyst, Single Reactor Multimodal Elastomers-Part 2

| Name | Reactor Temperature ° C. | Solvent Flow lb/hr | C2 Flow lb/hr | C8 Flow lb/hr | H2 Flow sccm | C2 Conversion % | Production rate lb/hr |
|---|---|---|---|---|---|---|---|
| Ex. 1 | 130 | 32.5 | 3.4 | 7.1 | 59 | 67 | 3.8 |
| Comp A | 150 | 25.9 | 3.6 | 8.2 | 115 | 72 | 4.5 |
| Comp B | 170 | 25.3 | 3.4 | 8.1 | 108 | 70 | 4.8 |
| Ex. 2 | 170 | 25.3 | 3.4 | 6.9 | 54 | 76 | 4.8 |
| Ex. 3 | 170 | 29.7 | 3.4 | 6.1 | 54 | 79 | 5.0 |
| Ex. 4 | 130 | 26.0 | 3.2 | 5.2 | 56 | 72 | 3.8 |
| Ex. 5 | 170 | 1188 | 138 | 299 | 2101 | 77 | 218 |
| Ex. 6 | 130 | 1174 | 131 | 218 | 2401 | 77 | 195 |
| Ex. 7 | 130 | 1159 | 138 | 198 | 2401 | 76 | 192 |
| Ex. 8 | 130 | 1044 | 115 | 181 | 2031 | 77 | 169 |
| Ex. 9 | 130 | 1170 | 141 | 201 | 4651 | 78 | 201 |
| Comp C | 165 | 36.0 | 3.1 | 6.1 | 4 | 93 | 4.8 |

TABLE 5

Process Conditions For Dual Catalyst, Dual Reactor Multimodal Elastomers

| | Example 10 | | Example 11 | | Example 12 | |
|---|---|---|---|---|---|---|
| | 1st Reactor | 2nd Reactor | 1st Reactor | 2nd Reactor | 1st Reactor | 2nd Reactor |
| Reactor Control Temp. (° C.) | 110 | 116 | 108 | 114 | 110 | 115 |
| Solvent Feed (lb/hr) | 206 | 180 | 241 | 140 | 275 | 93 |
| Ethylene Feed (lb/hr) | 21.6 | 18.0 | 25.2 | 13.5 | 28.8 | 9.0 |
| Octene Feed (lb/hr) | 36.1 | 19.2 | 41.8 | 13.9 | 47.7 | 9.2 |
| Reactor Ethylene Conc. (g/L) | 11.0 | 14.1 | 11.0 | 14.1 | 11.0 | 14.0 |
| Hydrogen Feed (SCCM) | 364 | 454 | 489 | 336 | 469 | 225 |
| Catalyst | BPP-B | CGC-A | BPP-B | CGC-A | BPP-B | CGC-A |
| Catalyst Flow (lb/hr) | 0.55 | 0.72 | 0.50 | 0.44 | 0.53 | 0.33 |
| Catalyst Conc. (ppm) | 39.9 | 39.9 | 39.9 | 39.9 | 39.9 | 39.9 |
| Cocatalyst-1 Flow (lb/hr) | 0.55 | 0 | 0.50 | 0 | 0.53 | 0 |
| Cocatalyst-1 Conc. (ppm) | 399 | 0 | 399 | 0 | 399 | 0 |
| Cocatalyst-2 Flow (lb/hr) | 0.49 | 0.26 | 0.57 | 0.16 | 0.66 | 0.12 |
| Cocatalyst-2 Conc. (ppm) | 498 | 498 | 498 | 498 | 498 | 498 |
| Cocatalyst-3 Flow (lb/hr) | 0 | 0.26 | 0 | 0.16 | 0 | 0.12 |
| Cocatalyst-3 Conc. (ppm) | 0 | 6000 | 0 | 6000 | 0 | 6000 |
| Production Rate (lb/hr) | 34.4 | 22.3 | 39.9 | 16.5 | 45.4 | 11.0 |

TABLE 6

Physical properties of multimodal (dual catalyst/single reactor and dual catalyst/dual reactor) and monomodal elastomers

| Name | I2 dg/min | Mooney | Density g/cc | V0.1 Pa-s | V100 Pa-s | LMW Fraction Mn kg/mol | LMW Fraction $C_8$ wt % | HMW Fraction Mn kg/mol | HMW Fraction $C_8$ wt % | HMW fraction wt % | Mn ratio | C8 delta* wt % |
|---|---|---|---|---|---|---|---|---|---|---|---|---|
| Example 1 | 0.2 | — | 0.867 | 50,257 | 773 | 8.6 | 39 | 238 | 34 | 35 | 28 | −6 |
| Comp A | — | 33 | 0.865 | 12,395 | 2,163 | 8.6 | 36 | 67 | 38 | 95 | 8 | 2 |
| Comp B | — | 35 | 0.868 | 13,796 | 2,230 | 8.6 | 36 | 61 | 35 | 94 | 7 | −1 |
| Example 2 | — | 35 | 0.867 | 60,282 | 1,648 | 9.6 | 39 | 117 | 34 | 57 | 12 | −5 |

TABLE 6-continued

Physical properties of multimodal (dual catalyst/single reactor and dual catalyst/dual reactor) and monomodal elastomers

| Name | I2 dg/min | Mooney | Density g/cc | V0.1 Pa-s | V100 Pa-s | LMW Fraction Mn kg/mol | LMW Fraction $C_8$ wt % | HMW Fraction Mn kg/mol | HMW Fraction $C_8$ wt % | HMW fraction wt % | Mn ratio | C8 delta* wt % |
|---|---|---|---|---|---|---|---|---|---|---|---|---|
| Example 3 | — | 42 | 0.866 | 60,282 | 1,648 | 8.3 | 38 | 96 | 35 | 70 | 12 | −3 |
| Example 4 | — | 43 | 0.866 | 42,805 | 1,976 | 7.4 | 34 | 102 | 39 | 72 | 14 | 5 |
| Example 5 | 0.8 | — | 0.859 | 15,952 | 825 | 4.2 | 39 | 92 | 44 | 62 | 22 | 5 |
| Example 6 | 0.7 | — | 0.860 | 14,162 | 1,065 | 6.6 | 40 | 99 | 44 | 63 | 15 | 4 |
| Example 7 | 0.4 | — | 0.864 | 22,628 | 1,190 | 7.1 | 37 | 111 | 41 | 59 | 16 | 4 |
| Example 8 | 0.3 | — | 0.866 | 23,897 | 1,780 | 6.1 | 38 | 89 | 43 | 79 | 15 | 5 |
| Example 9 | 4.2 | — | 0.866 | 2,206 | 540 | 4.4 | 37 | 63 | 41 | 59 | 14 | 4 |
| Example 10 | 1.0 | 19 | 0.864 | 9,804 | 1,018 | 9.6 | 30 | 95 | 45 | 64 | 10 | 15 |
| Example 11 | 0.6 | 28 | 0.863 | 14,295 | 1,457 | 9.7 | 30 | 92 | 45 | 75 | 9 | 15 |
| Example 12 | 0.3 | 39 | 0.861 | 22,050 | 1,973 | 8.7 | 30 | 87 | 46 | 86 | 10 | 15 |
| Comp C | 0.9 | — | 0.869 | 20,022 | 539 | 4.7 | 25 | 96 | 53 | 64 | 20 | 28 |
| ENGAGE ™ 8842 Monomodal | 1.0 | 25 | 0.857 | 10,308 | 1,503 | — | — | 57 | — | 100 | — | — |
| ENGAGE ™ 8100 Monomodal | 1.0 | 24 | 0.870 | 9,224 | 1,617 | — | — | 48 | — | 100 | — | — |
| ENGAGE ™ 8200 Monomodal | 5.0 | 8 | 0.870 | 1,511 | 683 | — | — | 33 | — | 100 | — | — |

— not measured
*HMW C8 wt % − LMW C8 wt %

Figure 2:
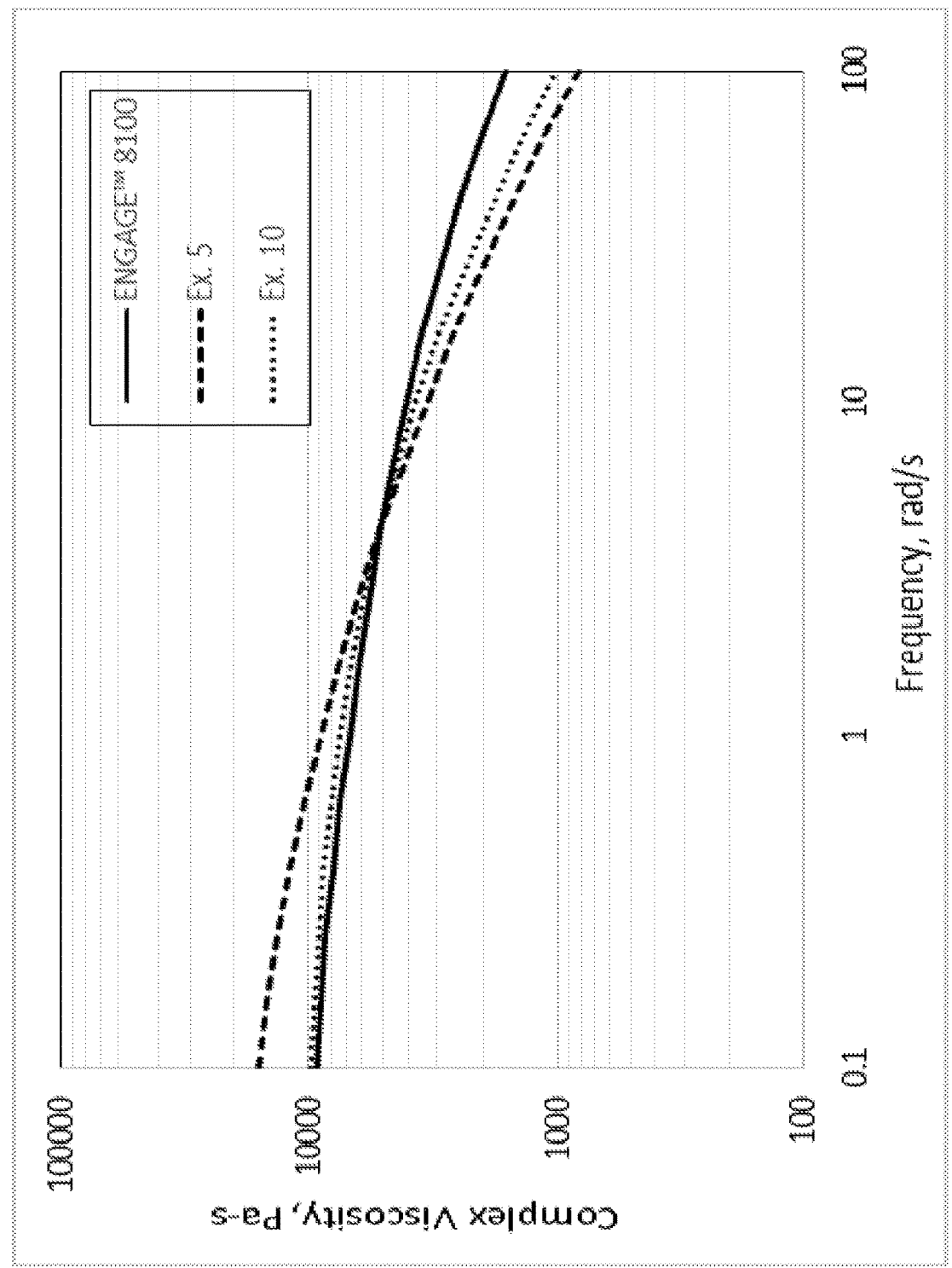
FIG. 2 is a graphical depiction of Dynamic Mechanical Spectroscopy (DMS) rheology data at 190° C. for multimodal and monomodal elastomers according to one or more embodiments of the present disclosure.

Referring to FIG. 1, GPC data is shown for a dual catalyst, single reactor multimodal elastomer example (Example 5), a dual catalyst, dual reactor multimodal elastomer example (Example 10) along with ENGAGE™ 8100, a monomodal elastomer comparative example. As shown, the multimodal elastomers have a broader molecular weight distribution and a higher molecular weight than the monomodal elastomer, regardless of whether the multimodal elastomer was produced in a single reactor system or a dual reactor system. Referring to Table 6, all examples have a HMW fraction with Mn greater than the monomodal ENGAGE™ examples. For application in TPO compounds, a high molecular weight elastomer is desired for impact toughening performance; however, high molecular weight must be balanced against the overall viscosity of the elastomer to allow dispersion of the elastomers in the PP matrix and for overall low viscosity of the TPO compound for injection molding processability. DMS rheology data for the same elastomers was shown in FIG. 2. As shown, multimodal Examples 5 and 10 and the monomodal elastomer ENGAGE™ 8100 have very similar shear viscosities. Thus, the multimodal elastomers may have a higher molecular weight which is desirable for impact toughening in TPOs; however, they maintain a comparable high shear viscosity (V100) to the monomodal elastomer, which is desirable for processability. High shear viscosity is more indicative of the rheology of the elastomers under typical mixing conditions in a twin screw extruder or under injection molding conditions.

In some cases, the combination of a CGC catalyst and a BPP catalyst in a single reactor does not allow for a low viscosity and a HMW fraction with high Mw. For example, Comp A and Comp B have only 5-6 wt % LMW fraction. The V100 of the elastomers is greater than 2000 Pa-s, higher than any of the inventive examples, yet the HMW Mn values are only 67 and 61 kg/mol, significantly less than for the inventive examples.

Additionally as shown in Table 6, Comp C, which includes two BPP catalysts produces a LMW fraction having less than 29% by weight octene incorporation, specifically 25% by weight. As shown in the tables below having less than 29% by weight of the α-olefin and more than 71% by weight of the ethylene is detrimental when the multimodal elastomer is incorporated into the TPO.

Preparation of Block Composite Compatibilizers (BC1, BC2 and BC3)

The block composite compatibilizers incorporated into the example TPO compounds described below are designated BC1, BC2, and BC3. They were prepared using two reactors connected in series. Each reactor was hydraulically full and set to operate at steady state conditions. The propylene and ethylene monomers, solvent, hydrogen, BPP-B, cocatalyst-1, cocatalyst-2 and CSA-1 are fed to the first reactor according to the process conditions outlined in Table 7. The first reactor contents as described in Table 7 flow to a second reactor in series. Additional monomers, solvent, hydrogen, BPP-B, cocatalyst-1, and optionally, cocatalyst-2, are added to the second reactor.

The properties of the block composites are outlined in Table 8 and block composite index values described in Table 9.

TABLE 7

Polymer Process for Block Composite

| Conditions | BC1 $1^{st}$ Reactor | BC1 $2^{nd}$ Reactor | BC2 $1^{st}$ Reactor | BC2 $2^{nd}$ Reactor | BC3 $1^{st}$ Reactor | BC3 $2^{nd}$ Reactor |
|---|---|---|---|---|---|---|
| Reactor Control Temp. (° C.) | 105 | 115 | 105 | 115 | 112 | 110 |
| Solvent Feed (lb/hr) | 421 | 564 | 470 | 489 | 240 | 242 |
| Propylene Feed (lb/hr) | 28.4 | 74.2 | 28.5 | 79.9 | 22.8 | 50.9 |
| Ethylene Feed (lb/hr) | 51.6 | 0 | 52.8 | 0 | 27.9 | 0 |

TABLE 7-continued

Polymer Process for Block Composite

|  | BC1 | | BC2 | | BC3 | |
| --- | --- | --- | --- | --- | --- | --- |
| Conditions | 1st Reactor | 2nd Reactor | 1st Reactor | 2nd Reactor | 1st Reactor | 2nd Reactor |
| Reactor Propylene Conc. (g/L) | 2.0 | 2.0 | 2.2 | 2.6 | 2.0 | 2.7 |
| Hydrogen Feed (SCCM) | 0 | 0 | 0 | 0 | 9.6 | 0.3 |
| Catalyst Flow (lb/hr) | 0.30 | 3.37 | 0.67 | 1.80 | 0.42 | 0.64 |
| Catalyst Conc. (ppm) | 100 | 100 | 75 | 300 | 50 | 500 |
| Cocatalyst-1 Flow (lb/hr) | 0.28 | 3.10 | 0.31 | 1.08 | 0.31 | 0.40 |
| Cocatalyst-1 Conc. (ppm) | 2000 | 2000 | 1794 | 4693 | 666 | 8000 |
| Cocatalyst-2 Flow (lb/hr) | 0.36 | 1.85 | 0.47 | 0.74 | 1.08 | 0.36 |
| Cocatalyst-2 Conc. (ppm) | 1000 | 500 | 494 | 1196 | 1797 | 1993 |
| CSA Flow (lb/hr) | 1.73 | 0 | 2.82 | 0 | 0.94 | 0 |
| CSA Concentration (ppm) | 37,500 | 0 | 25,998 | 0 | 4,946 | 0 |

TABLE 8

Physical Properties for Block Composite

| Property | BC1 | BC2 | BC3 |
| --- | --- | --- | --- |
| MFR (230° C., 2.16 kg), dg/min | 6.3 | 6.2 | 6.4 |
| Density (g/cc) | 0.789 | 0.879 | 0.877 |
| Mw, kg/mol | 131.6 | 133.3 | 154.6 |
| Mw/Mn | 2.94 | 2.67 | 3.01 |
| Total $C_{2,wt\%}$ | 35.5 | 33.1 | 28.5 |
| Tm, ° C. | 137.1 | 137.4 | 141.0 |
| Tc, ° C. | 96.9 | 97.5 | 95.8 |
| Tg, ° C. | −50.1 | −49 | −51.4 |
| Melt Enthalpy, J/g | 48.3 | 56.9 | 42.4 |

TABLE 9

Block Composite Index

| Line # | Variable | Source | BC1 | BC2 | BC3 |
| --- | --- | --- | --- | --- | --- |
| 1 | Overall wt % C2 Total | Measured | 35.5 | 33.1 | 28.5 |
| 2 | wt % C2 in PP block/polymer | Measured | 0.5 | 0.5 | 0.25 |
| 3 | wt % C2 in EP block/polymer | Measured | 65 | 65 | 55 |
| 4 | wt fraction iPP (in block or polymer) | Calculated | 0.457 | 0.495 | 0.484 |
| 5 | wt fraction EP (in block or polymer) | Calculated | 0.543 | 0.505 | 0.516 |
| 6 | Analysis of HTLC Separation | — | | | |
| 7 | wt fraction xylene soluble | Measured | 0.281 | 0.281 | 0.281 |
| 8 | wt fraction xylene insoluble | Measured | 0.719 | 0.719 | 0.719 |
| 9 | wt % C2 in xylene insoluble | Measured | 24.0 | 20.6 | 18.1 |
| 10 | wt fraction PP in insoluble | Calculated | 0.636 | 0.688 | 0.673 |
| 11 | wt fraction EP in insoluble fraction | 1-Line 10 | 0.364 | 0.312 | 0.327 |
| 12 | wt fraction Diblock in insoluble fraction | Line 11/Line 5 | 0.671 | 0.618 | 0.633 |
| 13 | Block Composite Index (BCI) | Calculated | 0.482 | 0.444 | 0.455 |

TPO Compounding

TPO compounds were prepared on a Coperion ZSK-25 mm twin screw extruder equipped with a water bath and strand cutter. Compounding conditions are listed in Table 12 below. All components were added via the main feed throat. The polymer components of the TPO formulations, which are listed in Table 10 and Table 11, were dry-blended along with the Irganox® B225 anti-oxidant and fed via a loss-in-weight feeder. A few drops of oil were added to the pellets to help adhere the anti-oxidant powder to the pellets. For the TPO formulations with talc listed in Table 11 below, the talc was fed to the main feed throat via a separate powder feeder.

TABLE 10

TPO Formulations without Talc

| Name | Elastomer | Elastomer wt % | BX3900 ICP wt % | BC1 wt % | Irganox B225 wt % |
| --- | --- | --- | --- | --- | --- |
| TPO 1 | Example 5 | 17.1 | 78.3 | 4.4 | 0.2 |
| TPO 2 | Example 10 | 17.1 | 78.3 | 4.4 | 0.2 |
| TPO Comp A | ENGAGE™ 8100 | 21.5 | 78.3 | 0 | 0.2 |

TABLE 11

Talc-Filled TPO Formulations

| Name | Elastomer | Elastomer wt % | H734 hPP wt % | BC2 wt % | BC3 wt % | Talc wt % | Irganox B225 wt % |
| --- | --- | --- | --- | --- | --- | --- | --- |
| TPO 3 | Example 10 | 33.8 | 53.8 | 2.25 | 0 | 10 | 0.2 |
| TPO 4 | Example 10 | 31.5 | 53.8 | 4.5 | 0 | 10 | 0.2 |
| TPO Comp B | ENGAGE™ 8842 | 31.5 | 53.8 | 4.5 | 0 | 10 | 0.2 |
| TPO 5 | Example 10 | 28 | 47.8 | 4 | 0 | 20 | 0.2 |
| TPO Comp C | ENGAGE™ 8842 | 32 | 47.8 | 0 | 0 | 20 | 0.2 |
| TPO Comp D | ENGAGE™ 8842 | 28 | 47.8 | 4 | 0 | 20 | 0.2 |
| TPO Comp E | ENGAGE™ 8200 | 32 | 57.8 | 0 | 0 | 20 | 0.2 |
| TPO Comp F | ENGAGE™ 8842 | 20 | 59.8 | 0 | 0 | 20 | 0.2 |
| TPO Comp G | Comp C | 16 | 59.8 | 0 | 4 | 20 | 0.2 |

TABLE 12

| Compounding Conditions | |
|---|---|
| ZSK-25 | Set point |
| Zone 1 Temp, °C. | 130 |
| Zone 2 Temp, °C. | 180 |
| Zone 3 Temp, °C. | 200 |
| Zone 4 Temp, °C. | 200 |
| Zone 5 Temp, °C. | 200 |
| Zone 6 Temp, °C. | 200 |
| Zone 7 Temp, °C. | 200 |
| Zone 8 Temp, °C. | 200 |
| Extruder RPM | 300 |
| Total rate, lb/hr | 30 |

ASTM D638 Type I tensile bars, ISO A tensile bars, and flow spirals were injection molded. Typical molding conditions used on a Krauss-Maffei KM 110-390/390 CL injection molding machine equipped with an Axxicon mold base are in Table 13. The spiral flow mold had channel dimensions of 2 mm×5 mm×1150 mm. The length of flow was recorded after molding according to conditions listed in Table 13.

TABLE 13

| Injection Molding Conditions | | | | |
|---|---|---|---|---|
| | TPO 1-2, TPO Comp A | | TPO 3-5, TPO Comp B-G | |
| Result | ISO Tensile | Spiral | ASTM Tensile | Spiral |
| Feed Throat Temp, °C. | 30 | 30 | 30 | 30 |
| Zone 1 Temp, °C. | 226 | 226 | 226 | 226 |
| Zone 2 Temp, °C. | 226 | 226 | 226 | 226 |
| Zone 3 Temp, °C. | 226 | 226 | 226 | 226 |
| Zone 4 Temp, °C. | 226 | 226 | 226 | 226 |
| Zone 5 Temp, °C. | 226 | 226 | 226 | 226 |
| Nozzle Temp, °C. | 226 | 226 | 226 | 226 |
| Mold Temp, °F. | 90 | 90 | 90 | 90 |
| Extruder rpm | 90 | 90 | 90 | 90 |
| Backpressure, bar | 50 | 50 | 50 | 50 |
| Dosage Delay, sec | 0 | 0 | 0 | 0 |
| Dosage, mm | 45 | 48 | 40 | 48 |
| Suckback, mm | 5 | 5 | 5 | 5 |
| Injection Speed, mm/s | 40 | 40 | 40 | 70 |
| Injection Pressure, bar | 2000 | 2000 | 2000 | 2000 |
| Switch Over Position, mm/s | 10 | 47 | 10 | 47 |
| Hold Pressure, bar | 425 | 800 | 425 | 1600 |
| Hold Time, sec | 21 | 30 | 21 | 23 |
| Cool Time, sec | 21 | 20 | 21 | 20 |

TABLE 14

TPO Properties for TPO Compounds without Talc

| Name | MFR, 230 °C., 2.16 kg, dg/min | Spiral Flow Length at 800 bar, cm | ISO Flex Mod, 1% sec, ksi | Charpy Strength, 23 °C., kJ/m2 | Charpy Strength, 0° C., kJ/m2 | Charpy Strength, -30° C., kJ/m2 | ISO Tensile Break strain, % |
|---|---|---|---|---|---|---|---|
| TPO 1 | 37.6 | 93 | 134 | 18.2 | 12.0 | 7.5 | 345 |
| TPO 2 | 30.8 | 90 | 141 | 17.9 | 11.6 | 7.7 | 73 |
| TPO Comp A | 30.3 | 85 | 147 | 14.2 | 9.9 | 7.0 | 64 |

TABLE 15

TPO Properties for Filled TPO Compounds

| Name | MFR, 230° C., 2.16 kg, dg/min | Spiral Flow Length at 1600 bar, cm | Izod Strength, 23° C., kJ/m2 | Izod Strength, 0° C., kJ/m2 | Izod Strength, -40° C., kJ/m2 | ASTM Tensile Break strain, % |
|---|---|---|---|---|---|---|
| TPO 3 | 14.0 | 100 | 70.0 | 73.0 | 38.7 | >330 |
| TPO 4 | 14.8 | 101 | 66.5 | 67.8 | 16.8 | 331 |
| TPO Comp B | 15.4 | 95 | 70.3 | 69.2 | 7.9 | 292 |
| TPO 5 | 11.9 | 97 | 68.2 | 71.6 | 50.0 | 332 |
| TPO Comp C | 11.9 | 89 | 72.5 | 71.8 | 14.9 | 163 |
| TPO Comp D | 13.1 | 90 | 73.9 | 67.7 | 18.5 | 274 |
| TPO Comp E | 22.0 | 100 | 50.9 | 24.4 | 4.4 | 77 |
| TPO Comp F | 22.2 | — | 42.7 | 7.8 | 5.8 | 42 |
| TPO Comp G | 26.6 | — | 37.3 | 7.4 | 4.6 | 20 |

TPO properties are shown in Table 14 and Table 15. Referring to Table 14, unfilled (talc-free) TPO compounds, TPO 1 and 2, which include multimodal elastomer Examples 5 (single reactor) and 10 (dual reactor), respectively, demonstrated higher injection molding flow to TPO Comp A, which includes an ENGAGE monomodal elastomer. Moreover, TPOs 1 and 2 demonstrated improved notched impact toughness as compared to the TPO Comp A. Specifically, there is a significant improvement in Charpy strength at temperatures of 0° C. and 23° C. Moreover, TPOs 1 and 2 also provide much higher tensile elongation-at-break than TPO Comp A, especially for TPO 1, the single reactor multimodal elastomer.

Referring to Table 15 which shows TPO compounds with talc filler, better low temperature notched impact toughness is achieved in combination with improved or comparable injection molding flow. Specifically, the Izod Strength at a temperature of −40° C. for TPOs 3 and 4 was much greater than TPO Comp B, which included ENGAGE™ 8842 monomodal elastomer. TPO 3, which included 10 wt % talc, demonstrated an Izod Strength at a temperature of −40° C. at least 4 times greater than TPO Comp B. At 20 wt % talc, TPO 5 demonstrated an Izod Strength at a temperature of −40° C. at least 3 times greater than TPO Comps C and D, which included ENGAGE monomodal elastomers. TPO 5 also had higher injection molding flow than TPO Comps C and D. At comparable to slightly lower injection molding flow, TPO 5 demonstrated much improved Izod impact strength as compared to TPO Comp E, with Izod Strength at a temperature of −40° C. at least 10 times greater than TPO Comp E.

Referring again to Table 15, TPO Comp G, a multimodal elastomer made with two biphenyl phenol catalysts does not show improved impact performance versus a monomodal control, ENGAGE™ 8842, in a talc-filled formulation, TPO Comp F.

Measurement Standards

Melt Index or $I_2$: Measured using ASTM D 1238, Condition 190° C., 2.16 kg.

Melt Flow Rate or MFR: Measured using ASTM D 1238, Condition 230° C., 2.16 kg.

Mooney: Mooney viscosity was measured according to ASTM D1646 at 125° C. using the ML 1+4 conditions.

Density: Measured in accordance with ASTM D792.

Dynamic Mechanical Spectroscopy (DMS)—Rheology: Sample rheology was analyzed by DMS, using an Advanced Rheometric Expansion System (ARES) equipped with 25 mm stainless steel parallel plates. Constant temperature dynamic frequency sweeps in the frequency range of 0.1 to 100 rad/s were performed under nitrogen purge at 190° C. Samples approximately 25.4 mm in diameter were cut from compression molded plaques. The sample was placed on the lower plate and allowed to melt for 5 min. The plates were then closed to a gap of 2.0 mm and the sample trimmed to 25 mm in diameter. The sample was allowed to equilibrate at 190° C. for 5 min before starting the test. The complex viscosity was measured at constant strain amplitude of 10%. Viscosity at 0.1 rad/s (V0.1) and at 100 rad/s (V100) are reported.

High Temperature Gel Permeation Chromatography (HT GPC):

A high temperature Gel Permeation Chromatography system (GPC IR) consisting of an Infra-red concentration detector (IR-5) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Mixed A LS, 20 micron columns. The chromatographic solvent (TCB) and the sample preparation solvent were from the same solvent source with 250 ppm of butylated hydroxytoluene (BHT) and nitrogen sparged. The samples were prepared at a concentration of 2 mg/mL in TCB. Polyethylene samples were gently shaken at 160° C. for 2 hours. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.42.

A third order polynomial was used to fit the respective polyethylene-equivalent calibration points obtained from equation (1) to their observed elution volumes of polystyrene standards.

Number, weight, and z-average molecular weights were calculated according to the following equations:

$$\overline{Mn} = \frac{\sum_i Wf_i}{\sum_i (Wf_i / M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component.

The MWD was expressed as the ratio of the weight average molecular weight (Mw) to the number average molecular weight (Mn).

The accurate A value was determined by adjusting A value in equation (1) until Mw calculated using equation (3) and the corresponding retention volume polynomial, agreed with the known Mw value of 120,000 g/mol of a standard linear polyethylene homopolymer reference.

GPC Deconvolution:

The GPC data was deconvoluted to give the most probable fit for two molecular weight components. There are a number of deconvolution algorithms available both commercially and in the literature. These may lead to different answers depending upon the assumptions used. The algorithm summarized here is optimized for the deconvolution problem of the two most probable molecular weight distributions (plus an adjustable error term). In order to allow for the variations in the underlying distributions due to the macromer incorporation and small fluctuations in the reactor conditions (i.e. temperature, concentration) the basis functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1, 2, 3) are derived with the third component (j=3) being an adjustable error term. The GPC data must be normalized and properly transformed into weight fraction versus $\text{Log}_{10}$ molecular weight vectors. In other words, each potential curve for deconvolution should consist of a height vector, $h_i$, where the heights are reported at known intervals of $\text{Log}_{10}$ molecular weight, the $h_i$ have been properly transformed from the elution volume domain to the $\text{Log}_{10}$ molecular weight domain, and the $h_i$ are normalized. Additionally, these data should be made available for the Microsoft EXCEL™ application.

Several assumptions are made in the deconvolution. Each component, j, consists of a most probable, Flory, distribution which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector.

$$X^2(\mu_j, \sigma_j, w_j) = \sum_{i=1}^{n}\left[\sum_{j=1}^{3} \cdot \sum_{k=1}^{20} w_j \cdot M_i^2 \cdot \lambda_{j,k}^2 \cdot CumND_{j,k} \cdot e^{-\lambda_{j,k} \cdot M_i} \cdot \Delta Log_{10}M - h_i\right]^2$$

$$\lambda_{j,k} = 10^{\mu_j + \frac{k-10}{3} \cdot \sigma_j}$$

The variable, $CumND_{j,k}$, is calculated using the EXCEL™ function "NORMDIST(x, mean, standard_dev, cumulative)" with the parameters set as follows:

$x=\mu_j+(k-10)*\sigma_j/3$ mean=$\mu_j$
standard dev=$\sigma_j$
cumulative=TRUE Table 16 below summarizes these variables and their definitions. The use of the EXCEL™ software application, Solver, is adequate for this task. Constraints are added to Solver to insure proper minimization.

TABLE 16

Variable Definitions

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j. |
| $w_j$ | Weight fraction of component j |
| K | Normalization term (1.0/$Log_e$ 10) |
| $M_i$ | Molecular weight at elution volume slice i |
| $h_i$ | Height of $log_{10}$ (molecular weight) plot at slice i |
| n | Number of slices in Log molecular weight plot |
| i | Log molecular weight slice index (1 to n) |
| j | Component index (1 to 3) |
| 1. k | Normal distribution slice index |
| $\Delta log_{10}M$ | Average difference between $log_{10}M_i$ and $log_{10}M_{i-1}$ in height vs. $log_{10}M$ plot |

The 8 parameters that are derived from the Chi-square minimization are $\mu_1, \mu_2, \mu_3, \sigma_1, \sigma_2, \sigma_3, w_1,$ and $w_2$. The term $w_3$ is subsequently derived from $w_1$ and $w_2$ since the sum of the 3 components must equal 1. Table II is a summary of the Solver constraints used in the EXCEL program.

TABLE 17

Constraint summary

| Description | Constraint |
|---|---|
| Maximum of fraction 1 | $w_1 < 0.95$ (User adjustable) |
| Lower limit of spreading function | $\sigma_1, \sigma_2, \sigma_3 > 0.001$ (must be positive) |
| Upper limit of spreading function | $\sigma_1, \sigma_2, \sigma_3 > 0.2$ (User adjustable) |
| Normalized fractions | $w_1 + w_2 + w_3 = 1.0$ |

Additional constraints that are to be understood include the limitation that only $\mu_j>0$ are allowed, although if Solver is properly initialized, this constraint need not be entered, as the Solver routine will not move any of the $\mu_j$ to values less than about 0.005. Also, the $w_j$ are all understood to be positive. This constraint can be handled outside of Solver. If the $w_j$ are understood to arise from the selection of two points along the interval $0.0<P_1<P_2<1.0$; whereby $w_1=P_1$, $w_2=P_2-P_1$ and $w_3=1.0-P_2$; then constraining P1 and P2 are equivalent to the constraints required above for the $w_j$.

Table 18 is a summary of the Solver settings under the Options tab.

TABLE 18

Solver settings

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of $\mu_1, \mu_2, w_1,$ and $w_2$ can be obtained by assuming two ideal Flory components that give the observed weight average, number average, and z-average molecular weights for the observed GPC distribution.

$$M_{n,GPC} = \left[w_1 \cdot \frac{1}{10^{\mu_1}} + w_2 \cdot \frac{1}{10^{\mu_2}}\right]^{-1}$$

$$M_{w,GPC} = [w_1 \cdot 2 \cdot 10^{\mu_1} + w_2 \cdot 2 \cdot 10^{\mu_2}]/M_{n,GPC}$$

$$M_{z,GPC} = [w_1 \cdot 6 \cdot 10^{\mu_1} + w_2 \cdot 6 \cdot 10^{\mu_2}]/M_{w,GPC}$$

$$w_1 + w_2 = 1$$

The values of $\mu_1, \mu_2, w_1,$ and $w_2$ are then calculated. These should be adjusted carefully to allow for a small error term, $w_3$, and to meet the constraints in Table II before entering into Solver for the minimization step. Starting values for $\sigma_j$ are all set to 0.05.

Octene Content Determination from HT GPC IR:

The octene content was determined using an IR-5 composition detector from Polymer Char Inc. The IR fixed band signals of "methyl", "methylene", and "measure" ("methyl"+"methylene") of the polymer were collected and processed for IR-5 composition mode. The compotation detector was calibrated using 11 metallocene solution produced ethylene/octene (EO) copolymers with octene wt % from 0 to 40 and one polyoctene (PO) homopolymer (100 wt % octene). All polymers have Mw around 40K or 100K respectively. The signal at the peak position was used for calibration. A linear relationship of octene wt % and IR-5 "methyl"/"measure" signal ratio was built these EO copolymers and the PO polymer.

The octene wt % distribution of a resin was obtained by using the IR-5 "methyl"/"measure" signals and the linear calibration of octene wt % and IR-5 "methyl"/"measure" signal ratio. The polymer chain end effect was corrected as one vinyl and one methyl at the ends of each chain.

For the bimodal resins, wt % of octene in each fraction was calculated as follows. For the high weight fraction (main peak), the octene wt % was calculated using the plateau of distribution curve at the main peak area. For the low weight fraction area (small peak), octene wt % was calculated in a narrow MW range (0.3 in log MW scale) in order to avoid the contamination of the main peak, and the scattering octene wt % signal at the elution low concentration ends.

Flexural Modulus: The flexural modulus test was performed according to either ISO 178 at 2 mm/min or ASTM D790 at 0.05 inch/min after conditioning for at least 40 hours at 73° F. and 50% relative humidity. 1% secant modulus was reported as the average for at least five specimens. Specimens were taken from injection molded ISO A or ASTM D638 Type I tensile bars for testing.

Izod Impact Strength: The notched Izod impact tests were done on injection molded ASTM specimens cut from ASTM D638, Type 1 tensile bars to have the dimensions of 62 mm×19 mm×3.175 mm. The samples were notched using a notcher to produce a notch depth 10.16±0.05 mm according to ASTM D256. Five specimens of each sample were tested using ASTM D256 at test temperatures of 23, 0, and −40° C. The energy value in kJ/m$^2$ was reported.

Charpy Impact Strength: The notched Charpy impact tests were done on injection molded ISO specimens cut from ISO A tensile bars. The samples were notched using a notcher according to ISO 179. Ten specimens of each sample were tested using ISO 179 at test temperatures of 23, 0, and −30° C. The energy value in kJ/m$^2$ was reported.

Tensile: Tensile properties were measured according to either ASTM D638 using injection molded ASTM D638, Type 1 tensile bars and a crosshead speed of 2 inch per minute or ISO 527 using injection molded ISO A tensile bars and a crosshead speed of 50 mm/min.

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc). With respect to DSC, the temperature at the maximum heat flow rate with respect to a linear baseline is used as the melting point. The linear baseline is constructed from the beginning of the melting (above the glass transition temperature) and to the end of the melting peak. For example, the temperature may be raised from room temperature to 200° C. at 10° C./min, maintained at 200° C. for 5 min, decreased to 0° C. at 10° C./min, maintained at 0° C. for 5 min and then the temperature may be raised from 0° C. to 200° C. at 10° C./min, and the data may be taken from this second heating cycle.

High Temperature Liquid Chromatography (HTLC): High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Brun, Y.; Foster, P. *J. Sep. Sci.* 2010, 33, 3501). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC: Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IRS detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;
From 10-651 min, TCB is increased linearly from 0% TCB to 80% TCB.

The injection also triggers the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter.

The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC: The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram is with Y represented by dW/dV, meaning the normalized weight fractions with respect to the elution volume.

X-Y pairs of data are also obtained from $I_{Rmethyl}$ and LS15 signals. The ratio of $I_{Rmethyl}/I_{Rmeasure}$ is used to calculate composition after calibration. The ratio of LS15/$I_{Rmeasure}$ is used to calculate weight-average molecular weight (Mw) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, Ω, is determined from the total LS15 signals ($A_{LS15}$) and the total $IR_{measure}$ signals ($A_{IR,measure}$):

$$\Omega = \frac{A_{LS15}}{A_{IR,measure}M_w}$$

The experimental LS15/$IR_{measure}$ ratio is then converted to $M_w$ through Ω.

Xylene Soluble Fractionation Analysis: is performed by using a weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

$^{13}$C Nuclear Magnetic Resonance (NMR) involves the following:

Sample Preparation: The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A multimodal elastomer comprising a copolymer of ethylene and at least one α-olefin monomer, wherein the multimodal elastomer comprises:
   20 to 90% by weight of a high molecular weight (HMW) fraction, wherein the HMW fraction has a number average molecular weight (Mn) of at least 50 kg/mol, when measured according to gel permeation chromatography (GPC), and wherein the HMW fraction comprises at least 35% by weight ethylene and at least 30% by weight α-olefin comonomer; and
   a low molecular weight fraction (LMW) fraction, wherein the LMW fraction has an Mn of 4 to 25 kg/mol, and wherein the LMW fraction comprises at least 50% by weight ethylene and at least 29% by weight α-olefin comonomer, and wherein the ratio of the Mn of HMW fraction to the Mn of the LMW fraction is at least 5 to 1;

wherein the multimodal elastomer has a density between 0.853 to 0.875 g/cc, a shear viscosity at 100 rad/s of less than 2,500 Pa-s, and a shear viscosity at 0.1 rad/s of less than 120,000 Pa-s.

2. The multimodal elastomer of claim 1, wherein the α-olefin monomer includes one or more α-olefins selected from $C_3$-$C_{12}$ α-olefins.

3. The multimodal elastomer of claim 1, wherein the α-olefin monomer is 1-octene.

4. The multimodal elastomer of claim 1, wherein the percent by weight of the α-olefin monomer incorporated in the HMW fraction is greater than the percent by weight of the α-olefin monomer incorporated in the LMW fraction.

5. The multimodal elastomer of claim 1, wherein the percent by weight of the α-olefin monomer in the HMW fraction is at least 4% by weight greater than the percent by weight of the α-olefin monomer in the LMW fraction.

6. The multimodal elastomer of claim 1, wherein the multimodal elastomer comprises 50 to 85 wt % of the high HMW fraction.

7. The multimodal elastomer of claim 1, wherein the multimodal elastomer has a shear viscosity at 0.1 rad/s of less than 60,000 Pa·s.

8. The multimodal elastomer of claim 1, wherein the ratio of the Mn of HMW fraction to the Mn of the LMW fraction is at least 8 to 1.

9. A thermoplastic olefin comprising:
the multimodal elastomer of claim 1; and
polypropylene.

10. The thermoplastic olefin of claim 9 comprising additional elastomers, block composites, fillers, or combinations.

11. A method of making a multimodal elastomer comprising:
adding to a reactor system at least one ethylene monomer, at least one α-olefin comonomer, a first catalyst comprising a biphenyl phenol complex, a second catalyst comprising a constrained geometry complex;
producing the multimodal elastomer via solution polymerization at a temperature of at least 100° C.,
wherein the multimodal elastomer comprises a high molecular weight (HMW) fraction and a low molecular weight (LMW) fraction,
wherein the HMW fraction has a number average molecular weight (Mn) of at least 50 kg/mol, when measured according to gel permeation chromatography (GPC), and wherein the HMW fraction comprises at least 35% by weight ethylene and at least 30% by weight α-olefin comonomer, and wherein the LMW fraction has an Mn of 4 to 25 kg/mol, and wherein the LMW fraction comprises at least 50% by weight ethylene and at least 29% by weight by weight α-olefin comonomer, and
wherein the multimodal elastomer comprises: a ratio of the Mn of the HMW fraction to the Mn of the LMW fraction of at least 5 to 1; a density between 0.853 to 0.875 g/cc; shear viscosity at 100 rad/s of less than 2,500 Pa·s; and a shear viscosity at 0.1 rad/s shear of less than 120,000 Pa·s.

12. The method of claim 11 wherein the multimodal elastomer comprises 20 to 90% by weight of a high molecular weight (HMW) fraction.

13. The method of claim 11, wherein the % by weight of the α-olefin monomer in the HMW fraction is at least 4% by weight greater than the % by weight of the α-olefin monomer in the LMW fraction.

14. The method of claim 11, wherein the reactor system comprises a single reactor.

15. The method of claim 11, wherein the reactor system comprises two reactors.

* * * * *